(12) United States Patent
Klockmann et al.

(10) Patent No.: US 8,236,882 B2
(45) Date of Patent: Aug. 7, 2012

(54) RUBBER MIXTURES

(75) Inventors: Oliver Klockmann, Niederzier (DE);
Andre Hasse, Linnich (DE);
Hans-Detlef Lughinsland, Hoboken, NJ (US)

(73) Assignee: Evonik Degussa GmbH, Essen (DE)

( * ) Notice: Subject to any disclaimer, the term of this patent is extended or adjusted under 35 U.S.C. 154(b) by 1040 days.

(21) Appl. No.: 10/991,509

(22) Filed: Nov. 19, 2004

(65) Prior Publication Data
US 2005/0124740 A1 Jun. 9, 2005

(30) Foreign Application Priority Data
Nov. 21, 2003 (DE) .................... 103 54 616

(51) Int. Cl.
*B60C 1/00* (2006.01)
*C08C 19/00* (2006.01)

(52) U.S. Cl. ........ 524/262; 524/261; 524/492; 524/493; 524/571; 525/332.5; 525/332.6; 525/332.7

(58) Field of Classification Search .................. 524/236, 524/261, 571, 492, 493, 262; 525/332.5, 525/332.6, 332.7
See application file for complete search history.

(56) References Cited

U.S. PATENT DOCUMENTS

| | | | | |
|---|---|---|---|---|
| 4,003,843 A * | 1/1977 | Kempermann et al. | ........ | 502/167 |
| 5,684,091 A * | 11/1997 | Maly et al. | .................. | 525/332.5 |
| 6,127,468 A * | 10/2000 | Cruse et al. | .................... | 524/225 |
| 6,329,457 B1 * | 12/2001 | Datta et al. | .................... | 524/270 |
| 6,414,061 B1 * | 7/2002 | Cruse et al. | .................... | 524/262 |
| 6,458,594 B1 * | 10/2002 | Baszczynski et al. | ........ | 435/468 |
| 6,528,673 B2 * | 3/2003 | Cruse et al. | .................... | 556/427 |
| 6,548,594 B2 | 4/2003 | Luginsland et al. | | |
| 6,608,125 B2 * | 8/2003 | Cruse et al. | .................... | 524/262 |
| 6,683,135 B2 * | 1/2004 | Cruse et al. | .................... | 525/100 |
| 6,982,050 B2 * | 1/2006 | Chauvin et al. | ............ | 264/36.14 |
| 7,074,876 B2 * | 7/2006 | Cruse et al. | .................... | 528/44 |
| 7,081,500 B2 * | 7/2006 | Cruse et al. | .................... | 525/326.1 |
| 2002/0058760 A1 * | 5/2002 | Jeske et al. | ................. | 525/331.8 |
| 2005/0085583 A1 * | 4/2005 | Hong | ............................. | 524/492 |
| 2005/0224150 A1 * | 10/2005 | Suzuki | ....................... | 152/209.6 |
| 2006/0161015 A1 * | 7/2006 | Klockmann et al. | .......... | 556/427 |

FOREIGN PATENT DOCUMENTS

| | | | |
|---|---|---|---|
| DE | 2 255 577 | | 6/1974 |
| DE | 26 58 368 A1 | | 7/1978 |
| DE | 195 44 469 A1 | | 3/1997 |
| DE | 100 08 641 A1 | | 8/2000 |
| DE | 100 15 309 A1 | | 10/2001 |
| DE | 102 23 658 A1 | | 12/2003 |
| EP | 695780 | * | 2/1996 |
| EP | 0 732 362 B1 | | 9/1996 |
| EP | 751178 A1 | * | 1/1997 |
| EP | 0 964 021 A2 | | 12/1999 |
| EP | 0 992 505 A2 | | 4/2000 |
| EP | 1 043 357 A1 | | 10/2000 |
| GB | 1310379 A | * | 3/1973 |
| GB | 1439247 A | | 6/1976 |
| JP | 2004-043640 | * | 2/1994 |
| WO | WO 03/020813 A1 | | 3/2003 |

OTHER PUBLICATIONS

Andre Hasse, et al., Rubber Reinforcement Systems, Technical Report, "Influence of Alkylsilanes on the Properties of Silica-filled Rubber Compounds".

esp@cenet database—Worldwide—English Abstract from GB 1439247 which corresponds to DE 2255577.

* cited by examiner

*Primary Examiner* — Vickey Nerangis
(74) *Attorney, Agent, or Firm* — Oblon, Spivak, McClelland, Maier & Neustadt, L.L.P.

(57) ABSTRACT

A rubber mixture which exhibits reliable processability contains (A) a rubber or mixture of rubbers, (B) a filler, (C) at least one organosilane, (D) a thiuram accelerator, and (E) a nitrogen-containing co-activator. A weight ratio of thiuram accelerator (D) to nitrogen-containing co-activator (E) is equal to or greater than 1.

13 Claims, 2 Drawing Sheets

RUBBER MIXTURES

BACKGROUND OF THE INVENTION

1. Field of the Invention

The present invention relates to a rubber mixture, to a process for its preparation and to its use.

2. Description of the Related Art

It is known to use silanes as adhesion promoters. For example, aminoalkyltrialkoxysilanes, methacryloxyalkyltrialkoxysilanes, polysulfanealkyltrialkoxysilanes and mercaptoalkyltrialkoxysilanes are used as adhesion promoters between inorganic materials and organic polymers, as crosslinkers and surface-modifying agents (E. P. Plueddemann, "Silane Coupling Agents", 2nd Ed. Plenum Press 1982).

These adhesion promoters, or coupling or bonding agents, form bonds both to the filler and to the elastomer and accordingly effect good interaction between the filler surface and the elastomer.

DE 22 55 577 dislcoses that the use of commercially available silane adhesion promoters having three alkoxy substituents on the silicon atom leads to the release of considerable quantities of alcohol during and after binding to the filler. Because trimethoxy- and triethoxy-substituted silanes are generally used, the corresponding alcohols, methanol and ethanol, are released in considerable quantities.

DE 10015309 discloses that the use of a mercaptosilane in combination with a long-chain alkylsilane in rubber mixtures leads to increased reinforcement and a reduced hysteresis loss. The alkylsilane is necessary to ensure that the rubber mixture can be processed reliably.

It is further known that methoxy- and ethoxy-substituted silanes are more reactive than the corresponding long-chain alkoxy-substituted silanes and accordingly are able to bind more rapidly to the filler, so that the use of methoxy and ethoxy substituents cannot be dispensed with from a technical and economic point of view.

From DE 10137809 there are known organosilicon compounds of the general formula

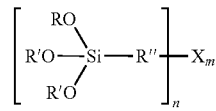

or of the general formula

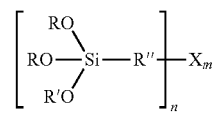

wherein R is a methyl or ethyl group,
the substituents R' are identical or different and are a $C_9$-$C_{30}$ branched or unbranched monovalent alkyl or alkenyl group, aryl group, aralkyl group, branched or unbranched $C_2$-$C_{30}$ alkyl ether group, branched or unbranched $C_2$-$C_{30}$ alkyl polyether group,
R" is a branched or unbranched, saturated or unsaturated, aliphatic, aromatic or mixed aliphatic/aromatic divalent $C_1$-$C_{30}$ hydrocarbon group,
X is $NH_{(3-n)}$ where n=1,2,3 and m=1, O(C=O)—R''' where n=1 and m=1, SH where n=1 and m=1, S where n=2 and m=1-10 and mixtures thereof, S(C=O)—R''' where n=1 and m=1 or H where n=1 and m=1, where R''' is a $C_1$-$C_{30}$ branched or unbranched alkyl or alkenyl group, aralkyl group or aryl group.

DE 10223658 discloses organosilicon compounds of the general formula

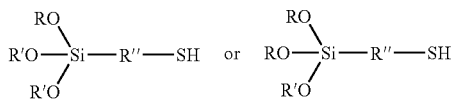

wherein R is a methyl or ethyl group,
the substituents R' are identical or different and are a $C_9$-$C_{30}$ branched or unbranched monovalent alkyl group,
R" is a branched or unbranched, saturated or unsaturated, aliphatic, aromatic or mixed aliphatic/aromatic divalent $C_1$-$C_{30}$ hydrocarbon group, R' is a mixture and the proportion of one component of the mixture is from 10 to 50 mol. %.

Disadvantages of the known rubber mixtures containing mercaptosilanes having long-chain alkoxy groups are the short incubation time and the short Mooney scorch time, which do not ensure reliable processability.

From WO 03/020813 it is known that the Mooney scorch time of silica-containing rubber mixtures can be prolonged by dispensing with the addition, customary in the case of silica-containing rubber mixtures, of diphenylguanidine while at the same time increasing the amount of added thiuram disulfide and at the same time adding a polyalkylene oxide. The addition of a polyalkylene oxide is disadvantageous, because it interferes with the crosslinking density (Technical Report TR 818 of Degussa AG).

SUMMARY OF THE INVENTION

It is an object of the present invention to provide a rubber mixture, containing at least one mercaptosilane, which has an incubation time similar to that of polysulfidic organosilanes to ensure reliable processability.

This and other objects have been achieved by the present invention the first embodiment of which includes a rubber mixture, comprising:
(A) a rubber or mixture of rubbers,
(B) a filler,
(C) at least one organosilane of formula I

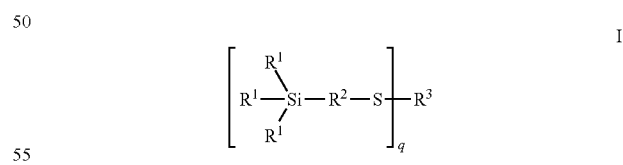

wherein each of $R^1$ is identical or different and is a $C_1$-$C_{12}$-alkyl group or a $R^{40}$ group, wherein each of $R^4$ is identical or different and is a $C_1$-$C_{30}$ branched or unbranched monovalent alkyl, alkenyl, aryl, aralkyl group or $(R^5)_3Si$ group, wherein each of $R^5$ is identical or different and is a $C_1$-$C_{30}$ branched or unbranched alkyl or alkenyl group,
wherein each of $R^2$ is identical or different and is a branched or unbranched, saturated or unsaturated, aliphatic, aromatic or mixed aliphatic/aromatic divalent $C_1$-$C_{30}$ hydrocarbon group, wherein $R^3$ is H, CN or (C=O)—$R^6$ for q=1, wherein $R^6$ is a $C_1$-$C_{30}$ branched or unbranched monovalent alkyl, alkenyl, aryl or aralkyl group, (C=O) for q=2 and P=S for q=3, and wherein q=1-3, (D) a thiuram accelerator, and (E) a nitrogen-containing co-activator, wherein a weight ratio of thiuram accelerator (D) to nitrogen-containing co-activator (E) is equal to or greater than 1.

In another embodiment, the present invention provides a process for the preparation of the above rubber mixture, comprising:

mixing the rubber or mixture of rubbers (A), a filler (B), an organosilane of the general formula I (C), a thiuram accelerator (D) and a nitrogen-containing co-activator (E) in a mixing unit.

In yet another embodiment, the present invention provides an article, comprising:

the above rubber mixture.

DETAILED DESCRIPTION OF THE INVENTION

Figure 1:
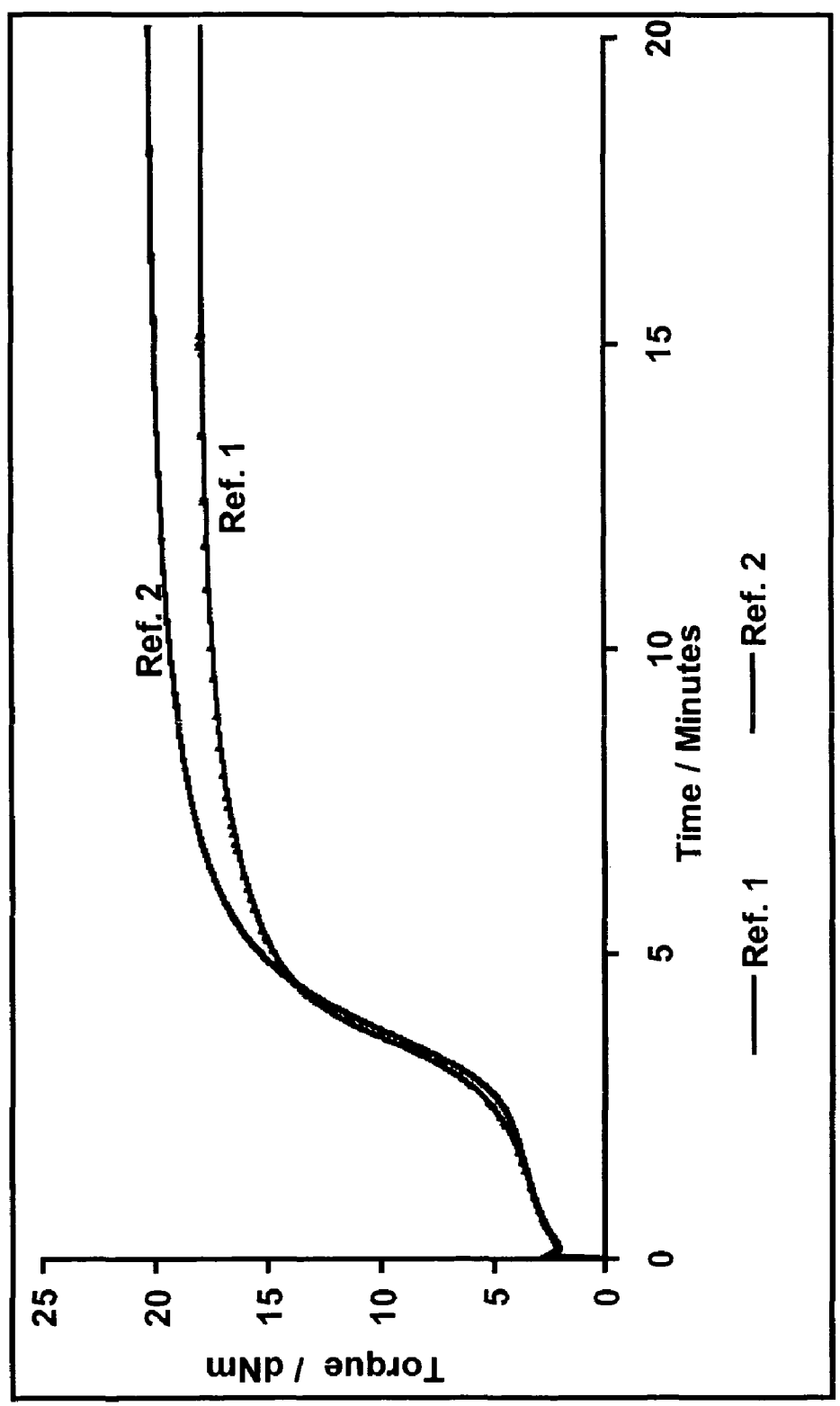
FIG. 1 shows the effect of the changed activator ratio on the vulcanization behavior.

The present invention provides rubber mixtures containing (A) a rubber or mixture of rubbers, (B) a filler, (C) an organosilane of the general formula I

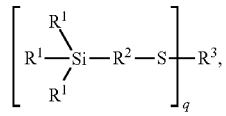

I wherein the substituents $R^1$ are identical or different and are a $C_1$-$C_{1-2}$-alkyl group or a $R^{40}$ group, wherein each of $R^4$ is identical or different and is a $C_1$-$C_{30}$ branched or unbranched monovalent alkyl, preferably methyl, ethyl, propyl or $C_9$-$C_{30}$-alkyl group, alkenyl, aryl, aralkyl group or $(R^5)_3Si$ group, wherein each of $R^5$ is identical or different and is a $C_1$-$C_{30}$ branched or unbranched alkyl or alkenyl group, each of $R^2$ is identical or different and is a branched or unbranched, saturated or unsaturated, aliphatic, aromatic or mixed aliphatic/aromatic divalent $C_1$-$C_{30}$ hydrocarbon group, $R^3$ is H, CN or (C=O)—$R^6$ for q=1, wherein each $R^6$ is identical or different and is a $C_1$-$C_{30}$, preferably $C_5$-$C_{20}$, particularly preferably $C_7$, branched or unbranched monovalent alkyl, alkenyl, aryl or aralkyl group, (C=O) for q=2 and P=S for q=3, and q=1-3, (D) a thiuram accelerator and (E) a nitrogen-containing co-activator, wherein the weight ratio of thiuram accelerator (D) to nitrogen-containing co-activator (E) is equal to or greater than 1, preferably from 1.0 to 4.0.

Natural rubber and/or synthetic rubbers can be used as the rubber (A). Preferred synthetic rubbers are described, for example, in W. Hofmann, Kautschuktechnologie, Genter Verlag, Stuttgart 1980. They may include, inter alia, polybutadiene (BR), polyisoprene (IR), styrene/butadiene copolymers having styrene contents of from 1 to 60 wt. %, preferably from 5 to 50 wt. % (SBR), isobutylene/isoprene copolymers (IIR), butadiene/acrylonitrile copolymers having acrylonitrile contents of from 5 to 60 wt. %, preferably from 10 to 50 wt. % (NBR), ethylene/propylene/diene copolymers (EPDM) as well as mixtures of these rubbers.

The styrene content of the styrene/butadiene copolymers includes all values and subvalues therebetween, especially including 5, 10, 15, 20, 25, 30, 35, 40, 45, 50, and 55 wt. %. The acrylonitrile content of the butadiene/acrylonitrile copolymers includes all values and subvalues therebetween, especially including 10, 15, 20, 25, 30, 35, 40, 45, 50, and 55 wt. %.

Solution-SBR, preferably solution-SBR having a vinyl content of at least 50%, may be used as the rubber (A). The vinyl content of the solution-SBR includes all values and subvalues therebetween, especially including 55, 60, 65, 70, 75, 80, 85, 90 and 95 wt %.

In one embodiment, the rubbers may be vulcanizable using sulfur.

As the filler (B) there may be used silicate-like fillers, for example precipitated or pyrogenic silicas, or carbon black. The silica can have a BET surface area of from 100 m²/g to 250 m²/g. The BET surface area of the silica includes all values and subvalues therebetween, especially including 110, 120, 130, 140, 150, 160, 170, 180, 190, 200, 210, 220, 230, and 240 m²/g.

The organosilane (C) of the general formula I may be a mixture of different organosilanes of formula I.

The mixture of different organosilanes of formula I may contain organosilanes of the general formula I having different groups $R^4$.

The organosilane (C) of the general formula I may be a mercaptopropyltrialkoxysilane of the general formula II

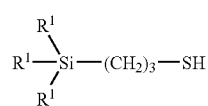

II in which $R^1$ is a mixture of ethoxy, dodecoxy, tetradecoxy, hexadecoxy and octadecoxy in amounts of in each case from 0% to 100%. The amount in each case includes all values and subvalues therebetween, especially including 10, 20, 30, 40, 50, 60, 70, 80 and 90%.

The organosilane (C) of the general formula I may be a mercaptopropyltrialkoxysilane in which the alkoxy groups $R^4O$ are a mixture of ethoxy, dodecoxy and tetradecoxy groups, preferably containing on average from 0.8 to 1.2 ethoxy groups, from 1.2 to 1.6 dodecoxy groups and from 0.4 to 0.8 tetradecoxy groups.

The organosilane (C) of the general formula I may be a mercaptopropyltrialkoxysilane in which the alkoxy groups $R^4O$ are a mixture of ethoxy and tetradecoxy groups, preferably containing on average from 0.8 to 1.2 ethoxy groups and from 1.8 to 2.2 tetradecoxy groups.

The organosilane (C) of the general formula I may be a mercaptopropyltrialkoxysilane in which the alkoxy groups $R^4O$ are a mixture of ethoxy, hexadecoxy and octadecoxy groups, preferably containing on average from 0.8 to 1.2 ethoxy groups, from 0.8 to 1.2 hexadecoxy groups and from 0.8 to 1.2 octadecoxy groups.

The organosilane (C) of formula I may be oligomerized or polymerized.

The organosilane (C) of formula I may be applied to a carrier. As the carrier there may be used, for example, carbon black, aluminium oxide, wax, thermoplastics, silica or silicates. The organosilane (C) of formula I may have been applied to an inorganic carrier or pre-reacted with an organic or inorganic carrier.

As the thiuram accelerator (D) there may be used thiuram sulfide accelerators, preferably thiuram monosulfides, thiuram disulfides, thiuram tetrasulfides or thiuram hexasulfides, particularly preferably tetrabenzylthiuram disulfide or tetramethylthiuram disulfide.

As the nitrogen-containing co-activator (E) there may be used amine co-activators. Guanidines, preferably diphenylguanidine, may be used as the amine co-activator.

The rubber mixtures may contain from 10 to 150 parts by weight of filler (B), based on 100 parts by weight of rubber. The amount of filler (B) includes all values and subvalues therebetween, especially including 20, 30, 40, 50, 60, 70, 80, 90, 100, 110, 120, 130 and 140 parts by weight of filler (B), based on 100 parts by weight of rubber.

The rubber mixtures may contain from 0.1 to 20 parts by weight of organosilane (C) of formula I, based on 100 parts by weight of rubber. The amount of (C) includes all values and subvalues therebetween, especially including 0.5, 1, 2, 3, 4, 5, 6, 7, 8, 9, 10, 12, 14, 16 and 18 parts by weight of organosilane (C) of formula I, based on 100 parts by weight of rubber.

The rubber mixtures may contain from 0.02 to 4 parts by weight, preferably from 0.02 to 1 part by weight, of thiuram accelerator (D), based on 100 parts by weight of rubber. The amount of (D) includes all values and subvalues therebetween, especially including 0.04, 0.06, 0.08, 0.1, 0.2, 0.4, 0.6, 0.8, 1, 1.2, 1.4, 1.6, 1.8, 2, 2.2, 2.4, 2.6, 2.8, 3, 3.2, 3.4, 3.6, and 3.8 parts by weight of thiuram accelerator (D), based on 100 parts by weight of rubber.

The rubber mixtures may contain from 0 to 2 parts by weight, preferably from 0.1 to 2 parts by weight, particularly preferably from 0.2 to 0.5 part by weight, of nitrogen-containing co-activator (E), based on 100 parts by weight of rubber. The amount of (E) includes all values and subvalues therebetween, especially including 0.02, 0.04, 0.06, 0.08, 0.1, 0.2, 0.3, 0.4, 0.5, 0.6, 0.8, 1, 1.2, 1.4, 1.6, and 1.8 part by weight, of nitrogen-containing co-activator (E), based on 100 parts by weight of rubber.

The rubber mixtures may contain from 10 to 150 parts by weight of filler (B), from 0.1 to 20 parts by weight of organosilane (C) of formula I, from 0.02 to 4 parts by weight, preferably from 0.02 to 1 part by weight, of thiuram accelerator (D) and from 0 to 2 parts by weight, preferably from 0.1 to 2 parts by weight, particularly preferably from 0.2 to 0.5 part by weight, of nitrogen-containing co-activator (E), the parts by weight being based on 100 parts by weight of rubber.

The rubber mixtures may contain at least 0.25 parts by weight of tetrabenzylthiuram disulfide or tetramethylthiuram disulfide, based on 100 parts by weight of rubber, and not more than 0.25 parts by weight of diphenylguanidine, based on 100 parts by weight of rubber.

The rubber mixtures may contain no alkylene oxide.

The rubber mixtures may additionally contain silicone oil and/or alkylsilane.

The rubber mixtures according to the present invention may contain further known rubber auxiliary substances, such as, for example, crosslinkers, vulcanization accelerators, reaction accelerators, reaction retardants, anti-ageing agents, stabilizers, processing aids, plasticizers, waxes, metal oxides and activators.

The rubber auxiliary substances may be used in amounts, which are governed inter alia by the intended use. Amounts may be, for example, amounts of from 0.1 to 50 wt. %, based on rubber. The amount of rubber auxiliary substances includes all values and subvalues therebetween, especially including 0.5, 1, 5, 10, 15, 20, 25, 30, 35, 40, and 45 wt. %, based on rubber.

As crosslinkers there may be used sulfur or organic sulfur donors.

The rubber mixtures according to the present invention may contain further vulcanization accelerators. Examples of suitable vulcanization accelerators may be mercaptobenzthiazoles, sulfenamides, guanidines, dithiocarbamates, thioureas and thiocarbonates.

Preferably, sulfenamide accelerators, for example cyclohexylbenzothiazolesulfenamide and/or dicyclohexylbenzothiazolesulfenamide and/or butylbenzothiazolesulfenamide, may be used.

The vulcanization accelerators and/or sulfur may be used in amounts of from 0.1 to 10 wt. %, preferably from 0.1 to 5 wt. %, based on the rubber used. The amount of vulcanization accelerators and/or sulfur includes all values and subvalues therebetween, especially including 0.5, 1, 2, 3, 4, 5, 6, 7, 8 and 9 wt. %, based on rubber.

The present invention also provides a process for the preparation of the rubber mixtures according to the present invention, wherein the rubber or mixture of rubbers (A), a filler (B), an organosilane of the general formula I (C), a thiuram accelerator (D) and a nitrogen-containing co-activator (E) are mixed in a mixing unit, the weight ratio of thiuram accelerator (D) to nitrogen-containing co-activator (E) being equal to or greater than 1.

Mixing can be carried out at a temperature below 165° C.

Mixing of the rubbers with the filler, optional rubber auxiliary substances and the organosilanes can be carried out in conventional mixing units, such as roll mills, internal mixers and mixing extruders. Such rubber mixtures can usually be prepared in internal mixers, the rubbers, the filler, the organosilanes and the rubber auxiliary substances first being mixed in at from 100 to 170° C. in one or more successive thermomechanical mixing steps. The temperature includes all values and subvalues therebetween, especially including 110, 120, 130, 140, 150 and 160° C. The sequence of addition and the time of addition of the individual components can have a decisive influence on the properties of the resulting mixture. Usually, the crosslinking chemicals can be added to the resulting rubber mixture in an internal mixer or on a roll at from 40 to 110° C., and processing to the so-called crude mixture for the subsequent process steps, such as, for example, shaping and vulcanization, can be carried out. The temperature includes all values and subvalues therebetween, especially including 50, 60, 70, 80, 90 and 100° C.

Vulcanization of the rubber mixtures according to the present invention can be carried out at temperatures of from 80 to 200° C., preferably from 130 to 180° C., optionally under pressure of from 10 to 200 bar. The temperature includes all values and subvalues therebetween, especially including 90, 100, 110, 120, 130, 140, 150, 160, 170, 180 and 190° C.

The rubber mixtures according to the present invention can be used in the production of molded bodies, for example for the production of pneumatic tires, tire treads, cable sheaths, hoses, drive belts, conveyor belts, roller coverings, tires, shoe soles, sealing elements, such as, for example, gaskets, and damping elements.

The present invention also provides molded bodies obtainable from the rubber mixture according to the present invention by vulcanization.

The rubber mixtures according to the present invention have the advantage that they possess an incubation time similar to that of rubber mixtures containing polysulfidic organosilanes and accordingly ensure reliable processability.

A further advantage is that the crosslinking density of the rubber mixtures according to the present invention does not change in comparison with rubber mixtures having a weight ratio of thiuram accelerator (D) to nitrogen-containing co-activator (E) of less than 1. The advantageous vulcanate data of the mercaptosilane-containing rubber mixtures are retained.

Having generally described this present invention, a further understanding can be obtained by reference to certain specific examples which are provided herein for purposes of illustration only, and are not intended to be limiting unless otherwise specified.

EXAMPLES

Examples 1-2

The formulation used for the rubber mixtures is shown in Table 1 below. In the Table, the unit phr denotes parts by weight based on 100 parts of the crude rubber used.

The silane A used for the example had the structure according to the following formula II

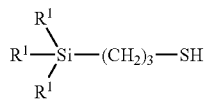

II wherein $R^1$=a mixture of ethoxy and $R^4O$ groups in a ratio of 1:2, the $R^4O$ groups being a mixture of dodecoxy and tetradecoxy in a weight ratio of 70:30.

The silane A was prepared as follows:

In a 10-litre four-necked flask, a mixture consisting of 2.925 kg of mercaptopropyltriethoxysilane (formula II where $R^1$=$CH_3CH_2O$) and 4.753 kg of a mixture of 70 wt. % dodecanol ($CH_3$—$(CH_2)_{11}$—OH) and 30 wt. % tetradecanol ($CH_3$—$(CH_2)_{13}$—OH) were heated with 1.464 ml of tetra-n-butyl orthotitanate to 110° C., and ethanol that forms was distilled off in vacuo in the course of 4 hours at a maximum of 50 mbar. 6.47 kg (98% of the theoretical yield) of a colourless, liquid mercaptopropyltrialkoxysilane of formula II were obtained, in which the $R^1$ groups were a mixture of ethoxy, dodecoxy and tetradecoxy groups with on average 1 ethoxy group, 1.5 dodecoxy groups and 0.5 tetradecoxy groups.

In reference mixture 3 and the Examples, the basic mixtures (1st+2nd step) were identical. They differed only in the amounts of the accelerator DPG and of the ultra-accelerator TBzTD (3rd step) that were used. Reference mixture 1 contained the organosilane Si 69. Because Si 69 was a sulfur donor and the mercaptosilane was not a sulfur donor, this was compensated for by using less sulfur in reference mixture 1 and in reference mixture 2 than in reference mixture 3 and the Example mixtures 1-2 containing the mercaptosilane.

TABLE 1

| Substance | Amount [phr] Ref. 1 | Amount [phr] Ref. 2 | Amount [phr] Ref. 3 | Amount [phr] Ex. 1 | Amount [phr] Ex. 2 |
|---|---|---|---|---|---|
| 1st step | | | | | |
| Buna VSL 5025-1 | 96 | 96 | 96 | 96 | 96 |
| Buna CB 24 | 30 | 30 | 30 | 30 | 30 |
| Ultrasil 7000 GR | 80 | 80 | 80 | 80 | 80 |
| ZnO | 3 | 3 | 3 | 3 | 3 |
| Stearic acid | 2 | 2 | 2 | 2 | 2 |
| Naftolen ZD | 10 | 10 | 10 | 10 | 10 |
| Vulkanox 4020 | 1.5 | 1.5 | 1.5 | 1.5 | 1.5 |
| Protector G35P | 1 | 1 | 1 | 1 | 1 |
| Si 69 | 6.4 | 6.4 | — | — | — |
| Silane A | — | — | 5.4 | 5.4 | 5.4 |
| 2nd step | | | | | |
| Batch step 1 | | | | | |
| 3rd step | | | | | |
| Batch step 2 | | | | | |
| Vulkacit D | 2 | 0.25 | 2 | 0.25 | 0.25 |
| Perkacit TBzTD | 0.2 | 0.6 | 0.2 | 0.5 | 0.75 |
| Vulkacit CZ | 1.5 | 1.5 | 1.5 | 1.5 | 1.5 |
| Sulfur | 1.5 | 1.5 | 2.2 | 2.2 | 2.2 |

The polymer VSL 5025-1 was a solution-polymerized SBR copolymer from Bayer AG having a styrene content of 25 wt. % and a butadiene content of 75 wt. %. The copolymer contains 37.5 phr of oil and had a Mooney viscosity (ML 1+4/100° C.) of 50.

The polymer Buna CB 24 was a cis-1,4-polybutadiene (neodymium type) from Bayer AG having a cis-1,4 content of at least 96% and a Mooney viscosity of 44±5.

Ultrasil 7000 GR was a readily dispersible silica from Degussa AG and has a BET surface area of 170 m²/g.

The coupling reagent Si 69, a bis-(triethoxysilylpropyl) tetrasulfide, was a product from Degussa AG.

The aromatic oil used was Naftolen ZD from Chemetall, Vulkanox 4020 is 6PPD from Bayer AG and Protektor G35P was an anti-ozone wax from HB-Fuller GmbH. Vulkacit D (DPG, diphenylguanidine) and Vulkacit CZ (CBS) were commercial products from Bayer AG. Perkacit TBzTD (tetrabenzylthiuram disulfide) was a product from Flexsys N.V.

The rubber mixture was prepared in three steps in an internal mixer, according to Table 2.

TABLE 2

| Step 1 | |
|---|---|
| Settings | |
| Mixing unit | Werner & Pfleiderer GK 1.5E |
| Friction | 1:1 |
| Speed | 60 min⁻¹ |
| Ram pressure | 5.5 bar |
| Volume when empty | 1.6 l |
| Degree of filling | 0.56 |
| Flow temp. | 70° C. |
| Mixing operation | |
| 0 to 1 min | Buna VSL 5025-1 + Buna CB 24 |
| 1 to 2 min | ½ Ultrasil 7000 GR, ZnO, stearic acid, Naftolen ZD, silane |
| 2 to 4 min | ½ Ultrasil 7000 GR, Vulkanox 4020, Protector G35P |
| 4 min | clean |
| 4 to 5 min | mix with variation in speed in order to maintain the temperature of 140-150° C. |
| 5 min | clean |
| 5 to 6 min | mix and complete the operation |
| Batch temp. | 140-150° C. |
| Storage | 24 h at room temperature |

TABLE 2-continued

Step 2

Settings

| | |
|---|---|
| Mixing unit | as in step 1 with the exception of: |
| Speed | 70 min$^{-1}$ |
| Degree of filling | 0.54 |
| Flow temp. | 70° C. |

Mixing operation

| | |
|---|---|
| 0 to 2 min | break up step 1 batch |
| 2 to 5 min | maintain batch temperature of 145-150° C. by varying speed |
| 5 min | complete the operation |
| Batch temp. | 145-150° C. |
| Storage | 4 h at room temperature |

Step 3

Settings

| | |
|---|---|
| Mixing unit | as in step 1 with the exception of |
| Speed | 40 min$^{-1}$ |
| Degree of filling | 0.52 |
| Flow temp. | 50° C. |

Mixing operation

| | |
|---|---|
| 0 to 2 min | step 2 batch + Vulkacit CZ + Vulkazit D + Perkacit TBzTD + sulfur |
| 2 min | complete the operation and form rolled sheet on laboratory roll mill (diameter 200 mm, length 450 mm, flow temperature 50° C.) homogenisation: cut in 3* on the left, 3* on the right and fold over and turn over 8* with a narrow roll gap (1 mm) and 3* with a wide roll gap (3.5 mm) and then draw out a rolled sheet |
| Batch temp. | 90-100° C. |

The general process for the preparation of rubber mixtures and their vulcanates is described in "Rubber Technology Handbook", W. Hofmann, Hanser Verlag 1994.

Testing of the rubber was carried out according to the test methods indicated in Table 3.

TABLE 3

| Physical testing | Standard/Conditions |
|---|---|
| ML 1 + 4, 100° C. (3rd step) | DIN 53523/3, ISO 667 |
| Start-of-vulcanization behavior, 130° C. | DIN 53523/4, ISO 667 |
| Vulcameter test, 165° C. | DIN 53529/3, ISO 6502 |
| $D_{max}$-$D_{min}$ | |
| t10% | |
| t80%-t20% | |
| Ring tensile test, 23° C. | DIN 53504, ISO 37 |
| Tensile strength | |
| Tensile stress | |
| Ultimate elongation | |
| Shore A hardness, 23° C. | DIN 53 505 |
| Ball rebound, 60° C. | DIN EN ISO 8307 |
| | steel ball 19 mm, 28 g |
| DIN abrasion, 10 N force | DIN 53 516 |
| Viscoelastic properties | DIN 53 513, ISO 2856 |
| 0 and 60° C., 16 Hz, 50 N preliminary force and 25 N amplitude force | |
| Complex modulus E* (MPa) | |
| Loss factor tan δ (−) | |
| Goodrich flexometer test | DIN 53533, ASTM D 623 A |
| 0.250 inch stroke, 25 min, 23° C. | |
| Contact temperature (° C.) | |
| Puncture temperature (° C.) | |
| Permanent set (%) | |

Table 4 shows the rubber-technological data for the crude mixture and the vulcanate.

TABLE 4

| Feature: | Unit: | Ref. 1 | Ref. 2 | Ref. 3 | Ex. 1 | Ex. 2 |
|---|---|---|---|---|---|---|
| Crude mixture data | | | | | | |
| ML(1 + 4) at 100° C., 3rd step | [ME] | 62 | 63 | 55 | 59 | 58 |
| Scorch time, t5 | [min] | 27.1 | 33.7 | 9.4 | 19.2 | 17.5 |
| Scorch time, t35 | [min] | 36.4 | 40.9 | 12.4 | 24.1 | 21.1 |
| Vulcanate data | | | | | | |
| Tensile strength | [MPa] | 13.1 | 13.7 | 13.2 | 14.7 | 12.2 |
| Tensile stress 100% | [MPa] | 1.7 | 2.0 | 1.7 | 1.8 | 1.8 |
| Tensile stress 300% | [MPa] | 9.1 | 11.5 | 11.5 | 11.5 | 11.8 |
| Tensile stress 300%/100% | [—] | 5.4 | 5.8 | 6.8 | 6.4 | 6.6 |
| Ultimate elongation | [%] | 370 | 335 | 325 | 340 | 300 |
| Shore A hardness | [SH] | 60 | 64 | 56 | 57 | 60 |
| Ball rebound, 60° C. | [%] | 65.8 | 68.1 | 75.8 | 75.2 | 75.6 |
| DIN abrasion | [mm$^3$] | 85 | 73 | 68 | 59 | 61 |
| Contact temperature | [° C.] | 56 | 56 | 53 | 53 | 51 |
| Puncture temperature | [° C.] | 101 | 98 | 94 | 93 | 91 |
| Permanent set | [%] | 3.4 | 2.0 | 3.5 | 2.2 | 2.2 |
| Dyn. modulus of elasticity E*, 0° C. | [MPa] | 16.0 | 16.9 | 9.3 | 10 | 10 |
| Dyn. modulus of elasticity E*, 60° C. | [MPa] | 7.3 | 8.2 | 5.8 | 6.2 | 6.3 |
| Loss factor tan δ, 0° C. | [—] | 0.369 | 0.359 | 0.306 | 0.310 | 0.312 |
| Loss factor tan δ, 60° C. | [—] | 0.099 | 0.088 | 0.069 | 0.070 | 0.062 |

Reference mixture 2 shows the effect of the changed thiuram/amine co-activator ratio on a rubber mixture which, like reference mixture 1, contains Si 69. If reference mixture 1 is compared with reference mixture 2 it will be seen that the scorch time is within the same order of magnitude.

If reference mixture 1 is compared with reference mixture 3, it is clear that reference mixture 3, which contains silane A, exhibits marked disadvantages in terms of processing behavior. It has lower scorch times, which has an adverse effect on the processability of the accelerated finished mixture (e.g. on extrusion). The processing reliability is impaired as a result, because pre-crosslinking is possible.

At the same time, reference mixture 3 containing the above-mentioned silane has considerable advantages in terms of the vulcanate data. The tensile stress at 300% elongation and the reinforcement factor are higher. At the same time, the elasticity (ball rebound) is considerably higher and the DIN abrasion is markedly improved. This shows a markedly higher coupling yield between the filler and the polymer, which is caused by silane A. The tan δ at 60° C., which is correlated with the rolling resistance, is also markedly better for reference mixture 3.

The two Examples 1 and 2 differ from reference mixture 3 in the composition of the accelerator system. The amount of the co-activator DPG has been markedly reduced and that of the ultra-accelerator TBzTD has been considerably increased. The crude mixture data of these mixtures are improved thereby. The scorch time is almost doubled compared with reference mixture 3. In mixtures containing Si 69 (reference mixture 2 compared with reference mixture 1), this is not the case.

Figure 2:
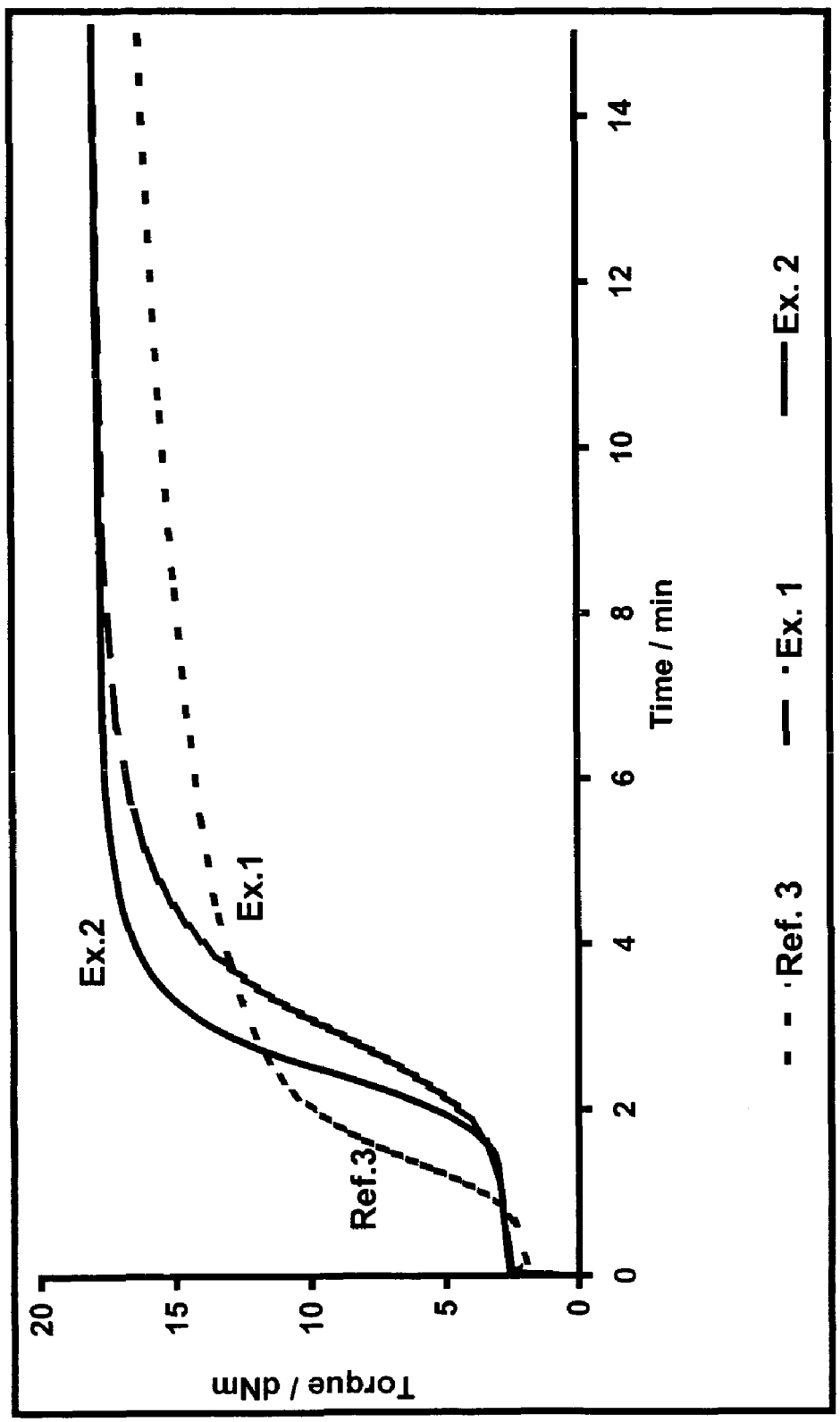
FIG. 2 shows the effect of the changed activator ratio on the vulcanization behavior.

The effect of the changed activator ratio on the vulcanization behavior is shown in FIGS. 1 and 2.

As can seen in FIG. 1, the change in the accelerator ratio in the case of the reference Si 69 has virtually no effect on the incubation time. In FIG. 2, on the other hand, the positive effect of the accelerator variation on the incubation time is clear. The beginning of the increase in torque is markedly displaced to longer times. Significantly higher processing reliability is obtained as a result. In addition, the marching modulus of reference mixture 3 is eliminated in Examples 1 and 2. These results are surprising because, when larger amounts of TBzTD are used, even more rapid vulcanization would be expected. Accordingly, an effect is obtained for silane A that cannot be observed with Si 69.

Changing the accelerator combination brings about virtually no change in the vulcanate data. The crude mixture properties of the silane A can be markedly improved without impairing the good vulcanate data.

Examples 3-8

The formulation used for the rubber mixtures described here is given in Table 5 below.

The rubber mixture was prepared in three steps in an internal mixer according to Table 2.

Testing of the rubber was carried out according to the test methods indicated in Table 3.

TABLE 5

| Substance | Amount [phr] Ref. 4 | Amount [phr] Ref. 5 | Amount [phr] Ex. 3 | Amount [phr] Ex. 4 | Amount [phr] Ex. 5 | Amount [phr] Ex. 6 | Amount [phr] Ex. 7 | Amount [phr] Ex. 8 |
|---|---|---|---|---|---|---|---|---|
| 1st step | | | | | | | | |
| Buna VSL 5025-1 | 96 | 96 | 96 | 96 | 96 | 96 | 96 | 96 |
| Buna CB 24 | 30 | 30 | 30 | 30 | 30 | 30 | 30 | 30 |
| Ultrasil 7000 GR | 80 | 80 | 80 | 80 | 80 | 80 | 80 | 80 |
| ZnO | 3 | 3 | 3 | 3 | 3 | 3 | 3 | 3 |
| Stearic acid | 2 | 2 | 2 | 2 | 2 | 2 | 2 | 2 |
| Naftolen ZD | 10 | 10 | 10 | 10 | 10 | 10 | 10 | 10 |
| Vulkanox 4020 | 1.5 | 1.5 | 1.5 | 1.5 | 1.5 | 1.5 | 1.5 | 1.5 |
| Protector G35P | 1 | 1 | 1 | 1 | 1 | 1 | 1 | 1 |
| Si 69 | 6.4 | — | — | — | — | — | — | — |
| Silane A | — | 5.4 | 5.4 | 5.4 | 5.4 | 5.4 | 5.4 | 5.4 |
| 2nd step | | | | | | | | |
| Batch step 1 | | | | | | | | |
| 3rd step | | | | | | | | |
| Batch step 2 | | | | | | | | |
| Vulkacit D | 2 | 2 | 0.25 | 0.25 | 0.25 | 0.25 | 0 | 0 |
| Perkacit TBzTD | 0.2 | 0.2 | 0.25 | 0.5 | 0.75 | 1 | 0.75 | 1 |
| Vulkacit CZ | 1.5 | 1.5 | 1.5 | 1.5 | 1.5 | 1.5 | 1.5 | 1.5 |
| Sulfur | 1.5 | 2.2 | 2.2 | 2.2 | 2.2 | 2.2 | 2.2 | 2.2 |

The rubber-technological data for the tested mixtures from Table 5 are shown in Table 6.

TABLE 6

| Feature: | Unit: | Ref. 4 | Ref. 5 | Ex. 3 | Ex. 4 | Ex. 5 | Ex. 6 | Ex. 7 | Ex. 8 |
|---|---|---|---|---|---|---|---|---|---|
| Crude mixture data | | | | | | | | | |
| ML(1 + 4) at 100° C., 3rd step | [ME] | 63 | 55 | 57 | 57 | 58 | 63 | 56 | 58 |
| Scorch time, t5 | [min] | 24.4 | 9.4 | 21.2 | 18.7 | 21.3 | 22.2 | 23.3 | 28.5 |
| Scorch time, t35 | [min] | 30.9 | 12.4 | 26.5 | 23.0 | 25.0 | 25.7 | 29.0 | 35.6 |
| Dmax − Dmin | [dNm] | 16.6 | 16.4 | 17.7 | 15.8 | 17.6 | 24.8 | 14.8 | 17.4 |
| t 10% | [min] | 1.6 | 1.0 | 2.1 | 1.9 | 1.9 | 1.3 | 2.3 | 2.3 |
| t 80% − t 20% | [min] | 2.2 | 7.1 | 5.0 | 2.3 | 1.5 | 1.5 | 2.4 | 2.7 |

TABLE 6-continued

| Feature: | Unit: | Ref. 4 | Ref. 5 | Ex. 3 | Ex. 4 | Ex. 5 | Ex. 6 | Ex. 7 | Ex. 8 |
|---|---|---|---|---|---|---|---|---|---|
| Vulcanate data | | | | | | | | | |
| Tensile strength | [MPa] | 13.7 | 13.2 | 12.8 | 11.2 | 12.0 | 12.2 | 10.8 | 11.3 |
| Tensile stress 100% | [MPa] | 1.7 | 1.7 | 1.5 | 1.7 | 1.9 | 1.9 | 1.8 | 2.0 |
| Tensile stress 300% | [MPa] | 9.4 | 11.5 | 9.1 | 11.1 | 12.0 | 11.4 | 11.3 | — |
| Ultimate elongation | [%] | 380 | 325 | 365 | 300 | 300 | 315 | 315 | 275 |
| Shore A hardness | [SH] | 62 | 56 | 56 | 57 | 59 | 62 | 58 | 60 |
| Ball rebound, 60° C. | [%] | 66.0 | 75.8 | 70.0 | 71.0 | 72.0 | 71.1 | 71.8 | 72.5 |
| DIN abrasion | [mm$^3$] | 72 | 68 | 57 | 49 | 50 | 57 | 49 | 52 |
| Contact temperature | [° C.] | 58 | 53 | 56 | 52 | 51 | 55 | 49 | 49 |
| Puncture temperature | [° C.] | 101 | 94 | 104 | 93 | 91 | 95 | 86 | 84 |
| Permanent set | [%] | 2.9 | 3.5 | 3.1 | 1.8 | 1.8 | 3.2 | 1.6 | 1.6 |
| Dyn. modulus of elasticity E*, 0° C. | [MPa] | 16.1 | 9.3 | 11.0 | 10.2 | 10.9 | 12.3 | 9.7 | 10.2 |
| Dyn. modulus of elasticity E*, 60° C. | [MPa] | 7.6 | 5.8 | 6.6 | 6.6 | 6.9 | 7.7 | 6.6 | 6.8 |
| Loss factor tan δ, 0° C. | [—] | 0.418 | 0.306 | 0.393 | 0.382 | 0.387 | 0.387 | 0.359 | 0.370 |
| Loss factor tan δ, 60° C. | [—] | 0.098 | 0.069 | 0.089 | 0.075 | 0.070 | 0.069 | 0.064 | 0.062 |

As can be seen from the results of Table 6, the change in the ratio of DPG to TBzTD brings about a marked improvement in the processing behavior of the crude mixtures compared with reference mixture 5. Mooney scorch, t 10% time and accordingly the incubation time are raised significantly and in some cases reach the level of reference mixture 4. At the same time, a profile of rubber values which is comparable to that of reference mixture 5 and is markedly superior to that of reference mixture 4 is obtained.

Examples 9-10

The formulation used for the rubber mixtures described here is shown in Table 7 below.

MPTES in this example was γ-mercaptopropyltriethoxysilane, which is obtainable as VP Si263 from Degussa AG, and silane B, which can be prepared according to Example 9 of EP 0958298 B1, is 3-octanoylthio-1-propyltriethoxysilane.

The rubber mixture was prepared in three steps in an internal mixer, according to Table 2.

Testing of the crude mixtures was carried out according to the test methods indicated in Table 3.

TABLE 7

| Substance | Amount [phr] Ref. 6 | Amount [phr] Ex. 9 | Amount [phr] Ref. 7 | Amount [phr] Ex. 10 |
|---|---|---|---|---|
| 1st step | | | | |
| Buna VSL 5025-1 | 96 | 96 | 96 | 96 |
| Buna CB 24 | 30 | 30 | 30 | 30 |
| Ultrasil 7000 GR | 80 | 80 | 80 | 80 |
| ZnO | 3 | 3 | 3 | 3 |
| Stearic acid | 2 | 2 | 2 | 2 |
| Naftolen ZD | 10 | 10 | 10 | 10 |
| Vulkanox 4020 | 1.5 | 1.5 | 1.5 | 1.5 |
| Protector G35P | 1 | 1 | 1 | 1 |
| MPTES | 2.4 | 2.4 | — | — |
| Silane B | — | — | 8.9 | 8.9 |
| 2nd step | | | | |
| Batch step 1 | | | | |
| 3rd step | | | | |
| Batch step 2 | | | | |
| Vulkacit D | 2.0 | 0.25 | 2.0 | 0.25 |
| Perkacit TBzTD | 0.2 | 0.60 | 0.2 | 0.60 |
| Vulkacit CZ | 1.5 | 1.5 | 1.5 | 1.5 |
| Sulfur | 2.2 | 2.2 | 2.2 | 2.2 |

Table 8 shows the results of the crude mixture tests for the tested mixtures from Table 7.

TABLE 8

| Crude mixture data | | | | | |
|---|---|---|---|---|---|
| Feature: | Unit: | Ref. 6 | Ex. 9 | Ref. 7 | Ex. 10 |
| ML(1 + 4) at 100° C., 3rd step | [ME] | 63 | 74 | 55 | 62 |
| Scorch time, t5 | [min] | 8.4 | 23.3 | 18.9 | 48.9 |
| Scorch time, t35 | [min] | 11.0 | 28.1 | 26.5 | 58.1 |
| Dmax − Dmin | [dNm] | 13.5 | 22.4 | 15.4 | 18.7 |
| t 10% | [min] | 0.8 | 1.0 | 1.8 | 3.7 |
| t 80% − t 20% | [min] | 2.1 | 2.4 | 5.3 | 11.1 |

As already shown in the preceding Examples, in the case of these two mercapto-functional silanes too, a change in the accelerator ratio leads to advantages in processing reliability. Both the scorch times and the t 10% time are improved in Examples 9 and 10 as compared with their two reference mixtures 6 and 7.

German patent application 103 54 616.2 filed Nov. 21, 2003, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A rubber mixture, comprising:
   (A) a rubber or mixture of rubbers,
   (B) a filler,
   (C) from 0.1 to 20 parts by weight of at least one organosilane of formula II, based on 100 parts by weight of rubber

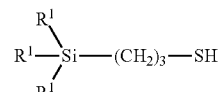

II wherein each $R^1$ is from 0% to 100% of at least one member selected from the group consisting of ethoxy, dodecoxy, tetradecoxy, hexadecoxy, octadecoxy and mixtures thereof,
   (D) from 0.02 to 4 parts by weight of tetrabenzylthiuram disulfide as a thiuram accelerator, based on 100 parts by weight of rubber, and (E) from 0.1 to 2 parts by weight, based on 100 parts by weight of rubber, of an amine-containing co-activator which is diphenylguanidine,
wherein a weight ratio of the thiuram accelerator (D) to the amine-containing co-activator (E) is greater than 1; and
(F) 0.1 to 10 wt. % of a sulfenamide, based on the rubber.

2. The rubber mixture according to claim 1, wherein the organosilane (C) is applied to an inert organic or inorganic carrier or pre-reacted with an organic or inorganic carrier.

3. The rubber mixture according to claim 1, wherein the organosilane (C) is present in oligomerized or polymerized form.

4. The rubber mixture according to claim 1, wherein the rubber (A) is a solution-SBR.

5. A process for the preparation of the rubber mixture according to claim 1, comprising:
mixing the rubber or mixture of rubbers (A), the filler (B), the organosilane of the general formula I (C), tetrabenzylthiuram disulfide (D) and the amine co-activator (E) in a mixing unit.

6. The rubber mixture according to claim 1, wherein the weight ratio of thiuram accelerator (D) to the amine co-activator (E) is from greater than 1.0 to 4.0.

7. The rubber mixture according to claim 1, wherein the filler (B) is a silica having a BET surface area of from 100 $m^2/g$ to 250 m2/g.

8. The rubber mixture according to claim 1, comprising from 10 to 150 parts by weight of filler (B), based on 100 parts by weight of rubber.

9. The rubber mixture according to claim 1, comprising
at least 0.25 parts by weight of tetrabenzylthiuram disulfide, based on 100 parts by weight of rubber, and
not more than 0.25 parts by weight of diphenylguanidine, based on 100 parts by weight of rubber.

10. The rubber mixture according to claim 1, wherein said sulfenamide is an accelerator.

11. An article, comprising:
the rubber mixture according to claim 1.

12. A rubber mixture, comprising:
(A) a rubber or mixture of rubbers,
(B) a filler,
(C) from 0.1 to 20 parts by weight of at least one organosilane of formula II, based on 100 parts by weight of rubber

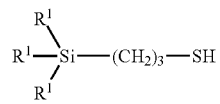

II wherein each $R^1$ is from 0% to 100% of at least one member selected from the group consisting of ethoxy, dodecoxy, tetradecoxy, hexadecoxy, octadecoxy and mixtures thereof,
(D) from 0.02 to 4 parts by weight of tetrabenzylthiuram disulfide as a thiuram accelerator, based on 100 parts by weight of rubber, and
(E) from >0 to 2 parts by weight of an amine-containing co-activator, based on 100 parts by weight of rubber, wherein said amine-containing co-activator diphenylguanidine;
wherein a weight ratio of the thiuram accelerator (D) to the amine-containing co-activator (E) is greater than 1; and
(F) 0.1 to 10 wt. % of a sulfenamide, based on the rubber.

13. A rubber mixture, comprising:
(A) a rubber or mixture of rubbers,
(B) a filler,
(C) from 0.1 to 20 parts by weight of at least one organosilane of formula II, based on 100 parts by weight of rubber

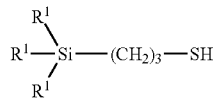

II wherein each $R^1$ is from 0% to 100% of at least one member selected from the group consisting of ethoxy, dodecoxy, tetradecoxy, hexadecoxy, octadecoxy and mixtures thereof,
(D) from 0.02 to 4 parts by weight of tetrabenzylthiuram disulfide as a thiuram accelerator, based on 100 parts by weight of rubber, and
(E) from 0.1 to 2 parts by weight, based on 100 parts by weight of rubber, of an amine-containing co-activator which is diphenylguanidine,
wherein a weight ratio of the thiuram accelerator (D) to the amine-containing co-activator (E) is greater than 1; and
(F) a sulfenamide;
wherein the organosilane (C) is applied to an inert organic or inorganic carrier or pre-reacted with an organic or inorganic carrier.

\* \* \* \* \*